United States Patent Office 3,766,104
Patented Oct. 16, 1973

3,766,104
NON-THROMBOGENIC POLYMERS CONTAINING QUATERNARY AMMONIUM GROUPS TO WHICH MOLECULES OF HEPARIN ARE BONDED
Yves Bonin, Lyon, and Claude Gigou, Vernaison, France, assignors to Rhone-Poulenc S.A., Paris, France
No Drawing. Filed May 19, 1971, Ser. No. 144,993
Claims priority, application France, May 21, 1970, 7018568
Int. Cl. A61k 17/18; C08b 25/00
U.S. Cl. 260—9
18 Claims

ABSTRACT OF THE DISCLOSURE

A non-thrombogenic polymer is provided consisting essentially of a macromolecular chain containing quaternary ammonium groups to which groups molecules of heparin are bonded, the macromolecular chain containing 0.01 to 0.80 quaternary ammonium group per 100 g., and consisting essentially of $m$ recurring units of formula:

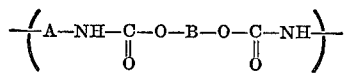

and $n$ recurring units of formula:

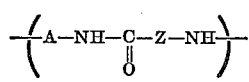

in which:

A is a divalent organic radical which is a straight or branched-chain alkylene radical containing from 3 to 10 carbon atoms, a cycloalkylene radical having 5 or 6 ring carbon atoms or a phenylene radical which is unsubstituted or substituted by one or two lower alkyl radicals or consists of two cycloalkylene or phenylene joined together by a divalent hydrocarbon radical of 1 to 4 carbon atoms or by an oxygen, sulphur or nitrogen atom;

B is a divalent radical obtained by removal of the terminal hydroxyl groups from a polyester of formula

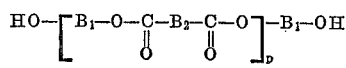

in which $B_1$ is a linear or branched, saturated or ethylenically or acetylenically unsaturated, aliphatic hydrocarbon radical containing 2 to 12 carbon atoms, which is unsubstituted or substituted by one or two lower alkyl radicals or by a dialkylamino radical optionally containing an intermediate alkylimino radical;

$B_2$ is a hydrocarbon chain containing 2 to 12 carbon atoms, a divalent hydrocarbon ring having 5 or 6 carbon atoms, or a divalent nitrogen-containing heterocyclic structure with 5 or 6 ring atoms of which 1 or 2 are nitrogen atoms, the said hydrocarbon chains and rings being saturated or unsaturated, unsubstituted or substituted by one or two lower alkyl radicals or by a dialkylamino radical or by a nitrogen-containing heterocyclic structure with 5 or 6 ring atoms attached by a nitrogen atom, it being possible for two of the chains or rings to be joined together by an alkylimino group; and the said heterocyclic structures being unsubstituted or substituted by a lower alkyl radical;

$p$ is a number such that the molecular weight of the polyester is between 300 and 10,000;

Z is a simple bond or a divalent radical which has the formula:

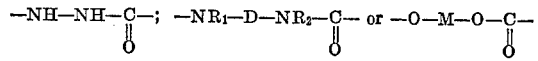

in which:

each of $R_1$ and $R_2$, which may be the same or different, is a hydrogen atom or a lower alkyl radical;

D is as defined under $B_2$, and M is as defined under $B_1$;

$m$ and $n$ are numbers such that the polymer has a specific viscosity, measured at 20° C. on a 2 g./l. solution in dimethylformamide, between 0.05 and 0.9, the ratio $m/n$ being from 0.5 to 10, and at least one of the radicals B, D and M contains at least one quaternary ammonium group.

The present invention relates to non-thrombogenic polymers, i.e. polymers which do not cause coagulation of the blood, in particular to those which retain their non-thrombogenic properties after prolonged contact with blood.

The present invention provides a non-thrombogenic polymer consisting essentially of a macromolecular chain containing quaternary ammonium groups to which groups molecules of heparin are bonded, the macromolecular chain containing 0.01 to 0.80 quaternary ammonium group per 100 g., consisting essentially of $m$ recurring units of formula:

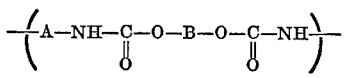

and $n$ receiving units of formula:

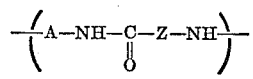

in which

A is a divalent organic radical which is a straight or branched-chain alkylene radical containing from 3 to 10 carbon atoms, a cycloalkylene radical having 5 or 6 ring carbon atoms, or a phenylene radical which is unsubstituted or substituted by 1 or 2 lower alkyl radicals, or consisting of two cycloalkylene or phenylene radicals joined to one another by a divalent hydrocarbon radical containing from 1 to 4 carbon atoms or by a heteroatom chosen from amongst oxygen, sulphur and nitrogen;

B is a divalent radical obtained by removal of the terminal hydroxyl groups from a polyester of formula

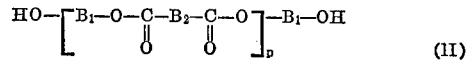
(II)

in which $B_1$ is a linear or branched, saturated or ethylenically or acetylenically unsaturated, aliphatic hydrocarbon radical containing 2 to 12 carbon atoms, which is unsubstituted or substituted by one or two lower alkyl radicals or by a dialkylamino radical optionally containing an intermediate alkylimino radical;

$B_2$ is a hydrocarbon chain containing from 2 to 12 carbon atoms, a divalent hydrocarbon ring with 5 or 6 carbon atoms, or a divalent nitrogen-containing heterocyclic structure with 5 or 6 ring atoms of which 1 or 2 are nitrogen atoms, the said hydrocarbon chains and rings being saturated or unsaturated, unsubstituted or substituted by one or two lower alkyl radicals or by a dialkylamino radical or by a nitrogen-containing heterocyclic structure with 5 or 6 ring atoms attached by a nitrogen atom, it being possible for two of the chains or rings to be joined to one another by an alkylimino group; and the said heterocyclic structures being unsubstituted or substituted, especially at a nitrogen atom, by a lower alkyl radical;

$p$ is a number such that the molecular weight of the polyester is between 300 and 10,000;

Z is a simple bond or a divalent radical which has the formula:

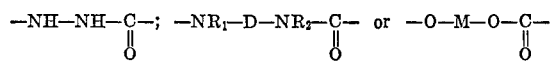

in which:

each of $R_1$ and $R_2$, which may be the same or different, represents a hydrogen atom or a lower alkyl radical;

D is as defined under $B_2$, and M is as defined under $B_1$;

$m$ and $n$ are numbers such that the polymer has a specific viscosity, measured at 20° C. on a 2 g./l. solution in dimethylformamide, between 0.05 and 0.9, the ratio $m/n$ being from 0.5 to 10, and at least one of the radicals B, D and M contains at least one quaternary ammonium group.

The term "lower alkyl" as used herein is defined as alkyl radicals which contain as most 4 carbon atoms.

The polymers of this invention can be obtained by bringing the quaternary ammonium polymers in contact with heparin. The quaternary ammonium polymers generally have a specific viscosity, measured at 20° C. on a 2 g./l. solution in dimethylformamide, which is above 0.1.

The quaternary ammonium polymers can themselves be obtained by preparing a polymer which is identical except that, B, D and/or M contain at least one tertiary nitrogen atom, and then quaternising the said nitrogen atom.

The polymers with tertiary nitrogen atoms can be obtained in known manner for polymers of the polyurethane type. It is sufficient for at least one of the reagents involved in the preparation of these polymers to contain at least one tertiary nitrogen atom.

Generally, an $\alpha,\omega$-dihydroxylic polyester of Formula II is prepared in a first stage, by choosing a ratio OH/COOH above 1, preferably between 1 and 2, for the initial diol and diacid. Thereafter the polyester is reacted with a diisocyanate of the formula $O=C=N-A-N=C=O$, selecting a ratio NCO/OH of the reagents which is greater than 1, preferably between 1.1 and 3.

The macrodiisocyanate obtained may then be brought into contact with an amount of a coupling agent sufficient to react with all the free $N=C=O$ bonds of the macrodiisocyanate, giving the units or the bond represented by Z above.

As previously stated, the tertiary nitrogen atoms can originate either from the polyester or, if appropriate, from the coupling agent. If they originate from the polyester, they can be present in the diacid and/or in the diol.

Diacids containing a tertiary nitrogen atom which may be used, include:

Acyclic aliphatic diacids in which the tertiary nitrogen atom is present in the main chain, such as alkyliminodialkanoic acids, for example methyliminodiacetic acid;

Acyclic aliphatic diacids in which the nitrogen atom is involved in the branching of the chain, such as dialkylaminoalkanedioic acids, for example 3-dimethylaminohexanedioic acid;

Cycloaliphatic or aromatic diacids in which one of the carbon atoms of the ring carries a dialkylamino substituent, such as 1 - dimethylamino-cyclopentane-2,3-dicarboxylic acid and dimethylamino-isophthalic and dimethylamino-terephthalic acids;

Diacids in which the carboxyl groups are bonded to a heterocyclic structure containing one or more tertiary nitrogen atoms, such as the diacids derived from pyrimidine, for example 1-methyl-pyrimidine-4,5-dicarboxylic acid, or acids containing an imidazole ring, for example 1-methyl-imidazole-4,5-dicarboxylic acid.

Suitable diols containing one or more tertiary nitrogen atoms which may be used include alkylamines substituted at the nitrogen atom by two hydroxyalkyl radicals, such as ethyldiethanolamine, or alkylene glycols substituted by a dialkylamino group at a non-hydroxylicarbon atom, such as $\gamma$ - dimethylamino- and $\gamma$ - diethylamino-propylene glycols.

Of course, if the tertiary nitrogen atoms originate neither from the diacid nor from the diol, the polyester can be prepared from various diacids and diols usually employed in the polyurethane industry. Suitable diacids include aliphatic diacids such as succinic, glutaric, adipic, pimelic, suberic, azelaic, sebacic, maleic and fumaric acids; cycloalkane-dicarboxylic acids such as cyclohexane-1,4-dicarboxylic acid; and aromatic diacids, such as phthalic acids and pyrimidine-dicarboxylic or imidazole-dicarboxylic acids. Suitable diols include 1,2-ethanediol, 1,2- and 1,3-propanediols, 1,2-, 1,3- and 1,4-butanediols, 1,5-pentanediol, 1,6 - hexanediol, 1,10-decanediol, 2,2-dimethyl-1,3-propanediol, 2,2-diethyl-1,3-propanediol, butenediol and butynediol.

The polyester may also be prepared from a mixture of several diacids and/or diols of which only a part possesses one or more tertiary nitrogen atoms. Equally, it is possible to introduce up to 10% of OH groups through polyols which contain from 3 to 8 OH groups per molecule such as trimethylolpropane, pentaerythritol, sucrose and sorbitol.

The diacid/diol condensation reaction is generally carried out at a temperature between 100 and 300° C., preferably between 150 and 220° C. The reaction generally takes place in the absence of a catalyst; it is however possible to accelerate the reaction by using from 0.0001 to 1%, relative to the weight of the reagents employed, of a catalyst such as para-toluenesulphonic acid, calcium acetate, butyl ortho-titanate or any other known catalyst [see, for example, "Polyesters," V. V. Korshak and S. V. Vinogradova (Pergamon Press 1965, p. 123–125)].

The molecular weight of the polyester of Formula II is preferably between 1200 and 2500.

It is preferred to use polyesters containing tertiary nitrogen atoms since this procedure, in effect, makes it possible, by choosing the diacid/diol reagents used, to obtain easily a high amount of tertiary nitrogen atoms and hence of quaternary ammonium groups in the resulting polymer to which the heparin molecules will bond. Amongst such polyesters polycondensates in which the tertiary nitrogen is introduced by the diol are preferred, and, more precisely, polycondensates obtained by reaction of a diacid with an alkylamine which is substituted at the nitrogen atom by two hydroxyalkyl radicals, such as ethyldiethanolamine.

To prepare the macrodiisocyanate, the dihydroxylic polyester of Formula (II) is reacted with a diisocyanate of formula $O=C=N-A-N=C=O$ such as 1,6-diisocyanate-hexane, 2,4-diisocyanato-toluene, 2,6-diisocyanato-toluene, meta-diisocyanato-benzene, 2,2-bis(4-isocyanato-cylohexyl)-propane, bis(4 - isocyanato-cyclohexyl)-methane, 1,5-diisocyanato-pentane, 1,4-diisocyanato-cyclohexane, or, advantageously, bis(4-isocyanato-phenyl)-methane. A mixture containing one or more diisocyanates and introducing up to 10% of the isocyanate groups through one or more compounds which contain from 3 to 8 isocyanate groups per molecule may also be used.

The reaction is generally carried out at a temperature between 20 and 150° C.; it can take place in bulk or in the presence of an inert and anhydrous solvent such as anhydrous toluene. The reaction generally takes place in the absence of a catalyst; it is however possible to add a catalyst such as those quoted by J. H. Saunders, and K. C. Frisch in "Polyurethane Chemistry and Technology," part 1, pages 165–170 (1962).

Various compounds can be used to effect the coupling of the macrodiisocyanate. Water, hydrazine, aminoacetic hydrazide, a diamine or a diol are preferably used. If the coupling agent is a diol of formula HO—M—OH, it is possible to use either a diol with tertiary nitrogen atoms, or a diol which does not contain such atoms, such as those listed above.

If a diamine of formula $HR_1N-D-NR_2H$ is used as the coupling agent, a compound having a tertiary nitrogen atom, such as 3-dimethylamino-1, 6-hexanediamine, 3-N-methylpiperazino-1,6-hexanediamine, 3-pyrrolidino - 1,6-hexanediamine, 3-piperidino-1,6-hexanediamine, 3-morpholino-1,6-hexanediamine, N-bis(3-aminopropyl)methylamine, N-bis(3-aminopropyl)cyclohexylamine and N-bis(3-aminopropyl)aniline may be used.

It is also possible to use a diamine which does not contain a tertiary nitrogen atom, such as ethylenediamine, 1,2-diaminopropane, 2,2-bis(4-aminocyclohexyl)propane, 1,6-diaminohexane, meta-phenylenediamine, a diaminocarbazole (especially the 2,3; 2,7 and 3,6 compounds) and N,N'-bis(carbonamidopropyl)-1,6-hexanediamine.

The coupling reaction is preferably carried out in a solvent consisting wholly or in part of an aprotic polar solvent, such as dimethylformamide, dimethylacetamide, dimethylsulphoxide or tris(dimethylamino)phosphine oxide. The reaction is generally carried out at a temperature of between —20 and 100° C.

The resulting polymer is then quaternised, either with a mono- or poly-quaternising agent. Suitable mono-quaternising agents include esters of inorganic acids, preferably alkyl, cycloalkyl and aralkyl halides and sulphates. The compounds in which the alkyl, cycloalkyl or aralkyl radicals contain at most 14 carbon atoms are particularly suitable. Methyl, ethyl, propyl, cyclohexyl and benzyl chlorides, bromides and iodides, and dimethylsulphate or diethylsulphate, may especially be mentioned. Halogen-containing derivatives containing other chemical groups, such as chloroacetaldehyde or bromoacetaldehyde, are also suitable.

Suitable poly-quaternising agents include polyhalogen derivatives of alkanes, alkenes, cycloalkanes or arylalkanes, especially alkylene, alkenylene, cycloalkylene or arylalkene dichlorides, polyhalogenated organic polymers or polyhalogenated organosilicon compounds, such as 1,3-dichloropropane, 1,3-dibromopropane, 1,4-dichlorobutane, 1,4-dibromobutane, 1,4-diiodobutane, 1,4-dichlorobutene - 2, bis(chloromethyl)xylenes, 1,3 - bis(chloromethyl)-1,1,3,3-tetramethyl-disiloxane and polyepichlorohydrin.

Of course it is possible to start the quaternisation with a mono-quaternising agent and, thereafter, to use a poly-quaternising agent, or vice-versa. The quaternisation is generally carried out by bringing the quaternising agent into contact with the polymer containing tertiary nitrogen atoms at a temperature of between 0° and 150° C., preferably between 20° and 110° C., with the polymer generally being in solution.

The attachment of heparin to the polymers with quaternary ammonium groups may be achieved by simple contact of the polymer with a solution containing heparin in the acid form or in the form of a salt of an alkali metal or alkaline earth metal. It is possible to carry out this process before shaping the polymer. In this case, the polymer is generally in the form of a solution and it is particularly easy to bring it into contact with the heparin solution. It is, however, also possible to effect the treatment with the heparin after shaping the polymer. This can be effected by immersing the shaped polymer in a heparin solution, or by coating, for example spraying or brushing, the surface of the polymer with this solution.

The concentration of the heparin solution as well as the duration and temperature of the treatment can vary within wide limits; in general, it is preferred to carry out the process at a temperature of between 20 and 40° C., with a solution of concentration 0.2 to 500 g./litre. The duration of the treatment is generally between 1 minute and 4 hours, depending on the temperature and on the concentration of the heparin solution. It is obviously possible to carry out several successive coatings.

The polymers of this invention can be shaped into, for example, spheres, films, spirals, slabs, tubes and other hollow bodies; they can also be for coating or lining the most diverse materials, such as fabrics, paper, glass, metals and organic or organo-silicon polymers. The polymers have good flexibility and good elasticity.

Of course during shaping, or if the polymer is used in the form of a coating composition, the polymer according to the invention can be combined with various materials, in particular inorganic or organic fillers; it is also possible to mix the polymers according to the invention with other polymers, in particular with polyurethane-polyureas which do not contain quaternary ammonium groups. The introduction of these latter polymers into the mixture should not, however, result in the proportion of quaternary ammonium groups dropping below 0.01 per 100 g. of mixture Polymers which contain at least 0.01 quaternary ammonium group per 100 g. of polymer make it possible to attach a large amount of heparin. The amount of heparin attached to the surface of the polymer is generally greater than 0.005 mg./cm.$^2$ and usually between 0.01 and 3 mg./cm.$^2$.

The polymers containing quaternary ammonium groups can generally withstand sterilisation treatments usually carried out in the medical field, for example in an autoclave at 120° C. in a moist atmosphere, $\gamma$-rays, alcohol, formaldehyde or ethylene oxide without damage.

The polymers of this invention are characterised by the high proportion of heparin which they contain and by the permanence of the heparin to the polymer chain. These two properties make them particularly valuable for the manufacture or lining of tubes, membranes or surgical appliances intended to be brought into contact with blood.

The following examples further illustrate the invention.

In these examples, the permanence of the attachment of the heparin is demonstrated by the following test: 0.5 cm.$^3$ of freshly withdrawn human blood is introduced into a tube of which at least the inner surface consists of a polymer of the invention. The tube is kept oscillating continuously for 1 hour at 37° C. and is then emptied, washed with distilled water and dried. Fresh blood is again introduced, and a series of cycles (introducing the blood, contact for 1 hour at 37° C., and rinsing the tube with distilled water) is then carried out until the blood coagulates. As shown below, several cycles can be carried out with the polymers of this invention before the blood coagulates.

In these examples, one of two polymers A and B is used. These polymers were prepared as follows.

POLYMER A (a) 1330 g. (10 mols) of ethyldiethanolamine and 1168 g. (8 mols) of adipic acid are introduced into a 4 litre stainless steel reactor, equipped with a stirrer. A gentle stream of nitrogen is passed into the apparatus and the mixture is heated whilst stirring. After 1 hour, distillation of the water starts, the temperature in the reaction mass being 150° C. The heating is adjusted so as not to exceed 170° C. in the mass. When the amount of water distilled reaches 220 cm.$^3$, benzene is injected into the apparatus (at a rate of 50 cm.$^3$/hour). After 29 hours' heating, 0.0022 COOH group per 100 g. of product is detected by analysis. The injection of benzene is stopped and the mixture is left for 1 hour 30 minutes under a stream of nitrogen, at 170° C., and the heating is then stopped and the mixture left to cool.

The product obtained contains 0.133 OH group and 0.0018 COOH group per 100 g. Its average molecular weight is 1480. The number of tertiary nitrogen groups is 0.442 per 100 g. of polyester.

(b) 148 g. (0.2 OH groups) of the polyester obtained under (a) and 18 g. (0.4 OH group) of freshly distilled 1,3-butanediol are introduced into a 0.5 litre glass reactor, equipped with a stirrer.

The mixture is heated to 80° C. and 75 g. (0.6 NCO group) of 4,4'-diisocyanato-diphenylmethane are then introduced. The mixture is stirred for 1 minute at atmospheric pressure and then placed under a vacuum (2 to 3 mm. Hg) for 3 minutes, to remove bubbles. The stirring is stopped; the system is returned to atmospheric pressure and the product is cast on a sheet of silicone elastomer.

The whole is placed in an oven at 120° C. and left at this temperature for ½ hour.

An elastomer is obtained, which is dissolved in dimethylformamide; 30 g. of elastomer cut into small pieces are introduced into a 250 ml. Pyrex reactor equipped with a frame-type stainless steel stirrer, and 115 g. of dimethylformamide (DMF) are added. The mixture is stirred; after 45 minutes, the elastomer has entirely dissolved. A solution having the following characteristics is obtained:

Viscosity at 25° C. _____ poises__ 2
Solids content _____ percent__ 26.7
Specific viscosity, at 2 g./litre in DMF at 20° C __ 0.130
Number of tertiary nitrogen groups per 100 g. ____ 0.270

POLYMER B

The polyester obtained in stage (a) of the preparation of polymer A is used. 888 g. of this polyester and 831 g. of toluene are introduced into a glass reactor of 2 l. capacity, equipped with a stirrer. 300 g. of toluene are distilled at atmospheric pressure in order to dehydrate the solution. The solution is cooled to 50° C. and 300 g. of 4,4'-diisocyanato-diphenylmethane and 300 g. of anhydrous toluene are then added. The mixture is heated at 80° C. for 1 hour and is then cooled to ambient temperature.

1900 g. of the polyurethane solution obtained above (1.13 free NCO groups) are slowly run into a 10 litre reactor, into which 4770 g. of dimethylformamide and 50 g. of aminoacetic hydrazide have beforehand been introduced. A solution of viscosity 10 poises at 25° C. is thus obtained. The pressure is reduced to 1 mm./Hg and the mixture then heated to 50–60° C.

1855 g. of solvent are distilled and a solution displaying the following characteristics is obtained:

Viscosity at 25° C. _____ poises__ 65
Solids content _____ percent__ 24.6
Specific viscosity of the polymer in dimethylformamide, at a concentration of 2 g./l. at 20° C. ___ 0.165
Number of tertiary nitrogen groups per 100 g. of polymer _____ 0.316

A film of 80μ thickness, obtained by casting this polymer on a sheet of glass and drying at 120° C., has the following mechanical properties (measured in accordance with standard specification AFNOR 46,002 T):

Tensile strength _____ kg./cm.²__ 300
Elongation at break _____ percent__ 770

After an elongation of 300%, the following characteristics are found:

Residual elongation _____ percent__ 42
Load for 100% elongation: extending __kg./cm.²__ 70
Load for 100% elongation: returning __kg./cm.²__ 6.1
Hysteresis _____ percent__ 64.6

After 5 elongations at 300%, the following characteristics are found:

Immediate residual elongation _____ percent__ 57
Delayed residual elongation (30 seconds) __do____ 38
Load for 100% elongation: extending __kg./cm.²__ 7.2
Load for 100% elongation: returning __kg./cm.²__ 4.5
Relaxation (30 seconds) _____ percent__ 22.3
Hysteresis _____ do____ 24.9

Examples 1 and 2

Polymer A, as a 26.7% solution in dimethylformamide is used. This polymer is subjected to quaternisation: to do this the quaternising agent is introduced into the solution of polymer, and the quaternisation reaction takes place during drying after coating.

The insides of glass tubes (internal diameter 1 cm., length 6 cm., surface area about 20 cm.²) are coated.

An aqueous solution of heparin (160 mg. of heparin per 50 cm.³ of solution) is introduced into the tubes to a height of 5.5 cm. and the solution is then kept in the tubes for 4 hours at 37° C. whilst oscillating; thereafter, the tubes are emptied, washed with distilled water and dried.

The amount of heparin attached is determined by measuring the difference in concentration of the heparin between the initial solution and the solution collected after being left in the tubes.

The table which follows indicates: the nature and amount of quaternising agent (per 100 g. of polymer solution A, of 26.7% solids content), the number of coatings carried out, and the method of drying, the amount of polymer deposited on the tube, the amount of heparin attached to the polymer (mg./cm.² of surface area of the tube), and the results of the test bringing the material into contact with freshly withdrawn human blood as described above (number of cycles before coagulation of the blood).

By way of comparison, if experiments 1 and 2 are repeated with tubes not treated with heparin, it is found that the coagulation of the blood occurs after 5 minutes.

| Ex. | Quaternising agent | Number of coatings, drying | Polymer deposited, mg. | Heparin attached, mg./cm.² | Number of cycles |
|---|---|---|---|---|---|
| 1 | 2,5-bis(chloromethyl)-1,4-dimethyl-benzene, 8.08 g. | 1, 6 hours at 80° C | 80 | 0.1 | 20 |
| 2 | Methyl iodide, 11.4 g | 1, 6 hours at 60° C | 110 | 0.1 | 20 |

Examples 3 to 14

Polymer B is used. This polymer is quaternised with various agents, following the technique described in Examples 1–2. Various tubes are coated with a 16.6% solution. The results are shown in the table below. The symbols a, b and c have the following meanings:

(a) Dimensions of the tube:

Internal diameter 0.4 cm.
Length 20 cm.
Surface area about 25 cm.

Nature: PVC plasticized with 27.8% by weight of octyl phthalate (b) Tube of Examples 1–2

(c) Tube of elastomer obtained from a composition comprising:

G.

Dimethylpolysiloxane rubber having terminal trimethylsiloxy groups, containing 0.23% by weight of methylvinylsiloxy units, and of viscosity $25 \times 16^6$ cp. at 25° C. _____ 100
Pyrogenic silica of high specific surface area, treated with octamethyl-cyclotetrasiloxane _____ 28
α,ω-dihydroxydimethylpolysiloxane oil (13% by weight of hydroxyl groups; viscosity 40 cp. at 25° C.) _____ 5.5
Paste consisting of a 50:50 mixture of benzoyl peroxide and a dimethylpolysiloxane oil of viscosity 1000 cp. at 25° C. _____ 2.8

After shaping and vulcanising the composition, the tube is treated with a primer containing, as a 10% solution in trichloroethylene, vinyltri(methoxyethoxy)silane (51 g.), γ-aminopropyltriethoxysilane (129 g.) and 69 g. of an organosilicon resin wherein the methyl/Si ratio=1.3.

The dimensions of the tube are:

Internal diameter _____ cm__ 0.32
Length _____ cm__ 30
Surace area _____ cm.² __ About 30

By way of comparison, if the experiments of Examples 3, 5 and 14 are repeated without carrying out the treatment with heparin, it is found that the time for coagulation of the blood is 7 minutes, 7 minutes and 5 minutes, respectively.

polyurea solution (C) of 23% solids content, the preparation of which is described below, each coating being followed by drying in an oven (1 hour at 80° C.).

1 internal coating with the polymer solution used for tube ($T_1$).

The total weight uptake is 1.6 g.

The polyurethane-polyurea (C) used in the first 6 coatings of the tubes ($T_4$) is prepared as follows:

865 g. (0.5 mol) of a polyadipate of ethylene glycol and propylene glycol (molar proportion 80/20), having

| Example | Quaternising agent | Nature of the tube | Number of coatings, type of drying | Polymer deposited, mg. | Heparin attached (mg./cm.²) | Number of cycles | Notes |
|---|---|---|---|---|---|---|---|
| 3 | 2,5-bis(chloromethyl)-1,4-dimethyl-benzene, 7.85 g. | Polyvinyl chloride (a) | 1, 1 hour at 110° C | 400 | 0.06 | 8 | |
| 4 | do | do | 2, 1 hour at 110° C | 650 | 0.1 | 18 | |
| 5 | do | Silicone elastomer (c) | 1, 1 hour at 110° C | 70 | 0.08 | 20 | |
| 6 | Methyl iodide, 11.05 g | Glass (b) | 1, 6 hours at 60° C | 70 | 0.11 | 20 | |
| 7 | do | do | do | 70 | 0.11 | 20 | Irradiation with 2.5 megarad after treatment with heparin. |
| 8 | do | do | do | 70 | 0.11 | 20 | Irradiation with 2.5 megarad before treatment with heparin. |
| 9 | 2,5-bis(chloromethyl)-1,4-dimethyl-benzene, 7.85 g. | do | do | 70 | 0.015 | 6 | |
| 10 | do | do | do | 70 | 0.015 | 6 | Irradiation with 2.5 megarad after treatment with heparin. |
| 11 | do | do | do | 70 | 0.015 | 6 | Irradiation with 2.5 megarad before treatment with heparin. |
| 12 | Benzyl chloride, 9.85 g | do | do | 70 | 0.015 | 6 | |
| 13 | 1,3-bis(chloromethyl)-1,1,3,3-tetramethyl-disiloxane, 8.95 g. | do | do | 70 | 0.015 | 5 | |
| 14 | Methyl iodide, 11.05 g | do | 2, 6 hours at 60° C | 150 | 0.4 | 50 | |

Examples 15 to 22

A series of experiments is carried out, using tubes of knitted polyester fabric [tubular knitted fabric produced on 17 needles, with 2 combined threads of poly(ethylene glycol terephthalate); gauge, 72 dtex, texturised]. After desizing, these tubes are shaped over mandrels of 0.4 cm. diameter (tubes $T_1$; $T_2$ and $T_4$) and of 0.5 cm. diameter (tube $T_3$) and left for 45 minutes in an oven at 170° C.

The tube ($T_1$) is given 3 internal and external coatings with a 16.6% solution of polymer B quaternised with 2,5-bis(chloromethyl)-1,4-dimethyl-benzene (7.85 g. of quaternising agent per 100 g. of polymer solution of 24.6% solids content); after each coating, the tube is dried in an oven (at 110° C., for 5 minutes). The total weight taken up is 750 mg. and the final dimensions are: internal diameter: 0.3 cm., length: 20 cm.

Other tubes ($T_2$ and $T_3$), of respectively, internal diameter 0.3 and 0.4 cm. and length 25 and 30 cm. successively received;

1 internal and external coating with the solution used for tube ($T_1$), followed by a period in an oven (45 minutes at 110° C.). The weight uptake was tube ($T_2$): 300 mg.; tube ($T_3$): 350 mg.

4 external coatings with the organosilicon composition containing methyltriacetoxysilane described in the example of French Pat. No. 1,568,130. After each coating, the tubes are exposed to air at 25° C. for 1 hour (relative humidity 60%) and then placed in an oven (30 minutes at 90° C.). Weight uptake: tube ($T_2$): 800 mg., tube ($T_3$): 750 mg.

1 internal coating with the solution used for tube ($T_1$), followed by a period in an oven (45 minutes at 110° C.). Weight uptake: tube ($T_2$): 100 mg.; tube ($T_3$): 150 mg.

Finally, other tubes ($T_4$), having the following dimensions: internal diameter: 0.3 cm., length 20 cm., successively received:

6 external and internal coatings with a polyurethanea molecular weight of 1730 (—COOH and —OH group content per 100 g.: 0.002 and 0.1137, respectively), and 780 g. of toluene are introduced into a glass reactor equipped with a stirrer.

300 g. of toluene are distilled at atmospheric pressure, the mixture is then cooled to 50° C., and 550 g. of a toluene solution containing 250 g. of 4,4'-diisocyanato-diphenylmethane (NCO/OH ratio=2) are added. The mixture is heated to 80° C. for 2 hours 30 minutes and is then cooled to ambient temperature.

1722 g. of the solution obtained are then introduced into a reactor into which 4166 g. of dimethylformamide and 41.12 g. of aminoacetic hydrazide have beforehand been introduced.

The solution obtained has a viscosity of 13 poises at 25° C.

The pressure is reduced to 1 mm. of mercury and the mixture is then heated to 50–60° C.; 1720 g. of solvent are thus removed.

The solution obtained shows the following characteristics:

Solids content _____ percent__ 23.9
Viscosity at 25° C. _____ poises__ 65
Specific viscosity of the polymer, at a concentration of 2 g./l. in dimethylformamide _____ 0.183

The various tubes, coated as just described, are then treated with heparin in accordance with the technique described in Examples 1–2.

A series of contact tests with blood is carried out on these tubes.

The following details are given below for each tube: the amount of heparin attached and the number of cycles required to cause the coagulation of the blood.

By way of comparison, the coagulation of the blood in tubes $T'_1$, $T'_2$, and $T'_4$ (which have not been treated with heparin) occurs after 3 minutes, 7 minutes and 8 minues, respectively.

| Example | Tube | Amount of heparin attached in— | | Number of cycles | Notes |
|---|---|---|---|---|---|
| | | Mg. | Mg./cm.² | | |
| 15 | T₁ | 7 | 0.15 | 25 | |
| 16 | T₂ | 1.5 | 0.06 | 23 | |
| 17 | T₃ | 2.25 | 0.06 | 20 | |
| 18 | T₃ | 2.25 | 0.06 | 20 | Tube sterilised for 1 hour at 60° C. in 90° alcohol, before being brought into contact with the blood. |
| 19 | T₃ | 2.25 | 0.06 | 17 | Tube sterilised for 1 hour at ambient temperature in a 2% aqueous solution of formaldehyde. |
| 20 | T₄ | 2 | 0.1 | 12 | |
| 21 | T₄ | 2 | 0.1 | 11 | Tube sterilised for 1 hour at 60° C. in 90° strength alcohol. |
| 22 | T₄ | 2 | 0.1 | 10 | Tube sterilised for 1 hour at ambient temperature in a 2% aqueous solution of formaldehyde. |

Examples 23 to 25

In a series of experiments, sheets of paper prepared according to Example 1 of French Pat. No. 1,272,081 are used as supports. The sheets of paper are 55µ thick, weigh 25 g./m.² and possess pores of average diameter 0.05µ.

A first sheet ($F_1$) is immersed in a 16.6% solution of polymer B quaternished with 2,5-bis(chloromethyl)-1,4-dimethyl-benzene (7.85 g. of quaternising agent per 100 g. of solution of 24.6% solids content).

A second sheet ($F_2$) is beforehand rendered water-repellent in accordance with the technique, and with the composition, described in the Example of French Pat. No. 1,568,130, and is then coated with quaternised polymer B in the same manner as sheet ($F_1$).

A third sheet ($F_3$) is rendered water-repellent as with sheet ($F_2$) and is then treated with a solution of polymer B quaternised with methyl iodide (11.05 g. of quaternising agent per 100 g. of 24.6% solution of polymer).

The sheets $F_1$, $F_2$ and $F_3$ are then immersed in an aqueous solution of heparin containing 50 mg. of heparin per 50 cm.³ of solution. The treatment lasts 4 hours at 37° C. The sheet is then washed with distillated water and thereafter dried.

A contact test with freshly withdrawn human blood (a variant of the test described above) is then carried out:

½ cm.³ of blood is placed, at ambient temperature, on a 4.5 cm. diameter disc cut from the sheet to be tested.

The disc is then shaken every 30 seconds for 1 hour 30 minutes, and is thereafter washed with distilled water and dried (60 minutes at 60° C.). The experiment is repeated until the blood coagulates.

The following details are indicated below, for each sheet: the amount of polymer deposited, the amount of heparin attached and the number of cycles required to cause the coagulation of the blood.

By way of comparison, the blood coagulates after about 30 minutes on a sheet $F_3'$ (not treated with heparin).

| Example | Sheet | Amount of— | | Number of cycles |
|---|---|---|---|---|
| | | Polymer deposited, g./m.² | Heparin, mg./cm.² | |
| 23 | $F_1$ | 20 | 0.01 | 14 |
| 24 | $F_2$ | 10 | 0.016 | 25 |
| 25 | $F_3$ | 2 | 0.015 | 25 |

Example 26

A solution of polymer B (7.85 g. of quaternising agent per 100 g. of solution of 24.6% solids content) is quaternised with 2,5-bis(chloromethyl)-1,4-dimethyl-benzene.

An 80µ thick film is prepared from this solution, the concentration of which is reduced to 16.6%, by casting on a sheet of glass and drying (1 hour at 120° C.). The film is then immersed in an aqueous solution of heparin (200 mg. of heparin per 60 cm.³ of solution) for 4 hours at 37° C., and is then washed with distilled water and dried (1 hour at 110° C.). The amount of heparin attached is 0.01 mg./cm.² of film.

A contact test with freshly withdrawn human blood is then carried out, in accordance with the technique used in Examples 23–25. The number of cycles required to cause the coagulation of the blood is 15.

Examples 27 to 29

In order to demonstrate the effect of the number of quaternary ammonium groups in the polymer, various coating compositions are prepared, containing polymer B quaternised by means of methyl iodide (11.05 g. of quaternising agent per 100 g. of solution of 23.6% solids content) and a varying proportion of polyurethane-polyurea (C).

These compositions are used to coat glass tubes. The coated tubes are then treated with heparin and thereafter subjected to the blood contact test.

The following details are indicated below: the proportion of each polymer in the coating composition, the amount of polymer deposited, the amount of quaternary ammonium groups per 100 g. of composition

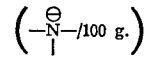

the amount of heparin attached (mg./cm.² of tube surface) and the number of times the coating is brought into contact with blood which are required to cause the coagulation of the blood.

| Ex. | Compolsition used | Composition of the mixture of polymers | | Amount of polymer deposited, mg. | $-\overset{\oplus}{\underset{|}{N}}-/100\ g.$ | Amount of heparin attached | Number of cycles |
|---|---|---|---|---|---|---|---|
| | | B, percent | C, percent | | | | |
| 27 | C₁ | 75 | 25 | 70 | 0.225 | 0.10 | 20 |
| 28 | C₂ | 50 | 50 | 70 | 0.150 | 9.03 | 7 |
| 29 | C₃ | 25 | 75 | 70 | 0.075 | 0.02 | 5 |
| 6 | Control | 100 | 0 | 70 | 0.316 | 0.11 | 20 |

Example 30

In order to demonstrate the permanent nature of the attachment of heparin to the quaternary ammonium polymer, a tube of polyvinyl chloride coated with polymer B and treated with heparin as described above (tube of Example 3) is used.

50 litres of a solution for artificial renal dialysis are circulated for 6 hours in the polyvinyl chloride tube, by means of a glass tube dipping to the bottom of the former; the composition (ionically similar to that of blood) of the solution is: sodium chloride 5.850 g./l., potassium chloride 0.112 g./l., magnesium chloride (6H₂O), 0.152 g./l., sodium acetate (3H₂O), 4.760 g./l. and calcium chloride (6H₂O), 0.328 g./l.

After rinsing with distilled water and drying (1 hour 110° C.), the contact test with the blood described above is carried out.

It is found that the coagulation of the blood only occurs after 6 cycles.

We claim:

1. A non-thrombogenic polymer prepared by the process which comprises reacting a polyhydroxy polyester of formula:

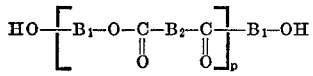

in which
$B_1$ is a linear or branched, saturated or ethylenically or acetylenically unsaturated, aliphatic hydrocarbon radical containing 2 to 12 carbon atoms, which is unsubstituted or substituted by one or two lower alkyl radicals or by a dialkylamino radical optionally containing an intermediate alkylimino radical;
$B_2$ is a hydrocarbon chain containing 2 to 12 carbon atoms, a divalent hydrocarbon ring having 5 or 6 carbon atoms, or a divalent nitrogen-containing heterocyclic structure with 5 or 6 ring atoms of which 1 or 2 are nitrogen atoms, the said hydrocarbon chains and rings being saturated or unsaturated, unsubstituted or substituted by one or two lower alkyl radicals or by a dialkylamino radical or by a nitrogen-containing heterocyclic structure with 5 or 6 ring atoms attached by a nitrogen atom, it being possible for two of the chains or rings to be joined together by an alkylimino group; and the said heterocyclic structures being unsubstituted or substituted by a lower alkyl radical;
and $p$ is a number such that the molecular weight of the polyester is between 300 and 10,000;
with an excess of an organic diisocyanate of formula:

$$O=C=N-A-N=C=O$$

in which
A is a divalent organic radical which is a straight or branched-chain alkylene radical containing from 3 to 10 carbon atoms, a cycloalkylene radical having 5 or 6 ring carbon atoms or a phenylene radical which is unsubstituted or substituted by one or two lower alkyl radicals, or consists of two cycloalkylene or phenylene radicals joined together by a divalent hydrocarbon radical of 1 to 4 carbon atoms or by a hetero atom selected from oxygen, sulphur and nitrogen; to form a polyurethane diisocyanate having a specific viscosity, measured at 20° C. and a 2 g./l. solution in dimethylformamide, between 0.05 and 0.9, and reacting the resulting product with a coupling agent selected from water, hydrazine, aminoacetic hydrazide, a diamine and a diol, with the proviso that at least one of the said compounds reacted with the diisocyanate contains a tertiary nitrogen atom in its chain, quaternising the resulting product to form 0.01 o 0.80 quaternary ammonium group per 100 g. of polymer and reacting the resulting product with heparin.

2. A polymer according to claim 1, in which the polyester contains a tertiary nitrogen atom.

3. A polymer according to claim 2, in which the radical $B_1$ of the polyester contains a tertiary nitrogen atom.

4. A polymer according to claim 1 in which the polymer has a specific viscosity, measured at 20° C. on a 2 g./l. solution in dimethylformamide, above 0.1.

5. A polymer according to claim 1 in which the polyester has a molecular weight from 1200 to 2500.

6. A polymer according to claim 1 which contains at least 0.005 mg./cm.² of surface, of heparin.

7. A polymer according to claim 6 which contains between 0.01 and 3 mg./cm.² of surface, of heparin.

8. A polymer according to claim 1 in which the polyester is derived from adipic acid.

9. A polymer according to claim 1 in which the polyester is derived from ethyldiethanolamine.

10. A polymer according to claim 1 in which the organic diisocyanate is 4,4'-diisocyanato diphenylmethane.

11. A polymer according to claim 1 in which the coupling agent is aminoacetic hydrazide or 1,3-butanediol.

12. A polymer according to claim 1 in the form of a film.

13. A process for the preparation of a polymer as claimed in claim 1 which comprises contacting a macromolecular chain polymer with quaternary ammonium groups, as defined in claim 1, with an aqueous solution of heparin, in the form of an acid or alkali metal or alkaline earth metal salt thereof.

14. A process according to claim 13 in which the polymer is obtained by reacting a polyester as defined in claim 1 with a diisocyanate of formula $$O=C=N-A-N=C=O$$

in which A is as defined in claim 1 and a coupling agent, and then quaternising the tertiary amino groups present.

15. A process according to claim 13 in which the quaternary ammonium polymer is shaped before being contacted with heparin.

16. In a coating composition the improvement wherein it comprises a polymer as claimed is claim 1.

17. A composition according to claim 16 which contains inorganic fillers or polymers consisting essentially of $m$ recurring units of formula:

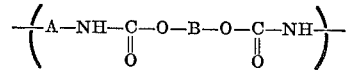

and $n$ recurring units of formula:

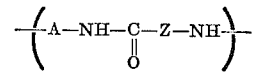

in which:
A is a divalent organic radical which is a straight or branched-chain alkylene radical containing from 3 to 10 carbon atoms, a cycloalkylene radical having 5 or 6 ring carbon atoms or a phenylene radical which is unsubstituted or substituted by one or two lower alkyl radicals, or consists of two cycloalkylene or phenylene radicals joined together by a divalent hydrocarbon radical of 1 to 4 carbon atoms or by a hetero atom selected from oxygen, sulphur and nitrogen;
B is a divalent radical obtained by removal of the terminal hydroxyl groups from a polyester of formula

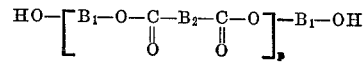

in which
$B_1$ is a linear or branched, saturated or ethylenically or acetylenically unsaturated, aliphatic hydrocarbon radical containing 2 to 12 carbon atoms, which is unsubstituted or substituted by one or two lower alkyl radical or by a dialkylamino radical optionally containing an intermediate alkylimino radical;
$B_2$ is hydrocarbon chain containing 2 to 12 carbon atoms, a divalent hydrocarbon ring having 5 or 6 carbon atoms, or a divalent nitrogen-containing heterocyclic structure with 5 or 6 ring atoms of which 1 or 2 are nitrogen atoms, the said hydrocarbon chains and rings being saturated or unsaturated, unsubstituted or substituted by one or two lower alkyl radicals or by a dialkylamino radical or by a nitrogen-containing heterocyclic structure with 5 or 6 ring atoms attached by a nitrogen atom, it being possible for two of the chains or rings to be joined together by an alkylimino group; and the said heterocyclic structures being unsubstituted or substituted by a lower alkyl radical;
$p$ is a number such that the molecular weight of the polyester is between 300 and 10,000;

Z is a simple bond or a divalent radical which has the formula:

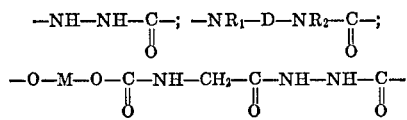

in which:

each of $R_1$ and $R_2$, which may be the same or different, is a hydrogen atom or a lower alkyl radical;

D is as defined under $B_2$, and M is as defined under $B_1$;

$m$ and $n$ are numbers such that the polymer has a specific viscosity, measured at 20° C. on a 2 g./l. solution in dimethylformamide, between 0.05 and 0.9, the ratio $m/n$ being from 0.5 to 10, the proportion of quaternary ammonium groups in the polymers of the composition being at least 0.01 per 100 grams of composition.

18. A composition according to claim 17 wherein the polymer is a polyurethane-polyurea, the proportion of quaternary ammonium groups in the polymers of the composition being at least 0.01 per 100 grams of composition.

References Cited

UNITED STATES PATENTS 3,617,344  11/1971  Leininger et al. __ 117—138.8 E
3,634,123  1/1972  Eriksson _____ 117—138.8 E HAROLD D. ANDERSON, Primary Examiner E. WOODBERRY, Assistant Examiner U.S. Cl. X.R.

117—138.8 E; 260—77.5 Q, AS; 424—183